United States Patent
Yuge et al.

(10) Patent No.: US 9,399,579 B2
(45) Date of Patent: Jul. 26, 2016

(54) SUBSTANCE-ENCAPSULATING CARBON NANOHORN AGGREGATE AND PROCESS FOR PRODUCING THE SAME

(75) Inventors: Ryota Yuge, Minato-ku (JP); Masako Yudasaka, Minato-ku (JP); Toshinari Ichihashi, Minato-ku (JP); Sumio Iijima, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 12/679,766

(22) PCT Filed: Jun. 16, 2008

(86) PCT No.: PCT/JP2008/060990
§ 371 (c)(1),
(2), (4) Date: Mar. 24, 2010

(87) PCT Pub. No.: WO2009/041130
PCT Pub. Date: Apr. 2, 2009

(65) Prior Publication Data
US 2010/0202976 A1     Aug. 12, 2010

(30) Foreign Application Priority Data
Sep. 25, 2007   (JP) .................. 2007-247269

(51) Int. Cl.
*C01B 31/02*  (2006.01)
*B82Y 40/00*  (2011.01)
*B82Y 30/00*  (2011.01)

(52) U.S. Cl.
CPC ............. *C01B 31/0293* (2013.01); *B82Y 30/00* (2013.01); *B82Y 40/00* (2013.01)

(58) Field of Classification Search
None
See application file for complete search history.

(56) References Cited

FOREIGN PATENT DOCUMENTS

| JP | 2005-343885 A | 12/2005 |
| JP | 2006-052115 A | 2/2006 |
| JP | 2006-182657 A | 7/2006 |
| JP | 2007-204310 A | 8/2007 |
| JP | 2007204310 A * | 8/2007 |

OTHER PUBLICATIONS

Hashimoto A, Yorimitsu H, Ajima K, Suenaga K, Isobe H, Miyawaki J, Yudasaka M, Iijima S, Nakamura E. Selective deposition of a gadolinium(III) cluster in a hole opening of single-wall carbon nanohorn. 2004 Proc. Natl. Acad. Sci, USA. 101: 8527-8530.*
Yuge R, Yudasaka M, Yorimitsu H, Kubo Y, Iijima S. Release-control of C60 by polyamine-plugs in nanohorn holes. Jul. 12-14, 2006. The 31st Fullerene-Nanotubes General Symposium, The Fullerenes and Nanotubes Research Society: p. 95.*
Miyawaki et al. Synthesis of ultrafine Gd2O3 nanoparticles inside single-wall carbon nanohorns. 2006 J. Phys. Chem. B. 110: 5179-5781.*
Murakami et al. Drug-loaded carbon nanohorns: adsorption and release of dexamethasone in vitro. 2004 Mol. Pharm. 1: 399-405.*
Elena Bekyarova et al., "Controlled Opening of Single-Wall Carbon Nanohorns by Heat Treatment in Carbon Dioxide", The Journal of Physical Chemistry, May 15, 2003, pp. 4479-4484, vol. 107, No. 19.
Kumiko Ajima et al., "Carbon Nanohorns as Anticancer Drug Carriers", Molecular Pharmaceutics, pp. 475-480, vol. 2, No. 6, 2005.

* cited by examiner

*Primary Examiner* — Michael G Hartley
*Assistant Examiner* — Jennifer Lamberski
(74) *Attorney, Agent, or Firm* — Sughrue Mion, PLLC

(57) ABSTRACT

A substance-encapsulating carbon nanohorn aggregate which has improved chemical stability by isolating the encapsulated substance from outside and which is useful as a targeting material which can be led from the outside of the body or as a contrast medium by holding the encapsulated substance in an aggregated form, and a process for producing the same are provided. The substance-encapsulating carbon nanohorn aggregate is characterized in that the encapsulated substance is aggregated in a central part of the carbon nanohorn aggregate or a neighborhood thereof with being isolated from outside. The process includes aggregating a substance to be encapsulated in a central part or a neighborhood thereof by a heat treatment.

3 Claims, 5 Drawing Sheets

SUBSTANCE-ENCAPSULATING CARBON NANOHORN AGGREGATE AND PROCESS FOR PRODUCING THE SAME

FIELD OF THE INVENTION

The present invention relates to a carbon nanohorn aggregate encapsulating a substance such as fine particles therein and a process for producing the same.

DESCRIPTION OF THE RELATED ART

Recently, it has been studied to use various inorganic substances or organic substances as a carrier for a drug in drug delivery systems (DDS). With the rapid development of nanotechnology, nanoparticles have attracted particular attention as such a carrier and a number of reports have been made so far.

Under such circumstances, nano carbon materials of nano size including carbon nanotubes and carbon nanohorns have received increasing attention, and attempts have been made to modify such nano carbon materials so as to give them functions such as biocompatibility and medicinal properties in addition to properties resulting from characteristic structures of nano size substances.

For example, Patent Document 1 focuses on specific structures of carbon nanohorns and discloses a technique relating to a novel aggregate and a process for producing the same, in which a functional molecule having a physiological or pharmacological activity is introduced into the sheath of nanohorns. Also, Non-Patent Document 1 describes that since the above-described carbon nanohorn aggregate into which a drug is introduced has sustained release properties and the substance in the aggregate has a pharmacological activity, the aggregate can be applied to a drug delivery system (DDS) drug.

Further, Patent Document 2 reports an application using a carbon nanohorn as a carrier for a contrast medium in MRI and provides a contrast medium which satisfies the requirement of low toxicity, realizes diagnosis in small areas and can be easily synthesized in large amounts by supporting Fe or Gd therein.

Also, Patent Document 3 reports that after encapsulating metal fine particles in a carbon nanohorn aggregate having an opening therein, the opening is closed so as to prevent elution of fine particles of metal or the like in the body.

Patent Document 1: Japanese Patent Laid-Open No. 2005-343885
Patent Document 2: Japanese Patent Laid-Open No. 2006-182657
Patent Document 3: Japanese Patent Laid-Open No. 2007-204310
Non-Patent Document 1: Mol. Pharm., 2004, 1, 399

DISCLOSURE OF THE INVENTION

Problems to be Solved by the Invention

In such a contrast medium for MRI as disclosed in Patent Document 2, the sheath of nanohorns remains open although the substance having a contrast effect is supported in the nanohorns, and therefore the substance having a contrast effect has come into contact with the surroundings in some cases. As a result, the elution or the change of properties of the substance in the body has been a major problem in practical use.

Also, in the carbon nanohorn aggregate encapsulating metal fine particles disclosed in Patent Document 3, the encapsulated metal fine particles are present in the region near the tip of nanohorns, and therefore generally the fine particles have a diameter of about 2 nm. In that case, ferromagnetism is not satisfactorily exhibited even though metal which exhibits ferromagnetism such as Fe is encapsulated, and thus a problem is that, for example, transferring carbon nanohorns to the intended position from the outside of the body using a magnet, in other words, targeting, is impossible. Moreover, since encapsulated fine particles are dispersed in the tip of the sheath of carbon nanohorns in nanosize, another problem is that no sufficient contrast effect can be expected when used as a contrast medium.

The present invention has been made under the above circumstances and a first object of the present invention is to provide a substance-encapsulating carbon nanohorn aggregate in which the encapsulated substance is isolated from outside and which has high chemical stability without causing elution or the like in an environment such as the body, and a process for producing the same.

A second object of the present invention is to provide a substance-encapsulating carbon nanohorn aggregate which is useful as a targeting material which can be led from outside of the body or as a contrast medium, by allowing the dispersed encapsulated substance to be held in an aggregated form, and a process for producing the same.

Means for Solving the Problems

To solve the above problems, the present invention has the following characteristics.

Specifically, in the substance-encapsulating carbon nanohorn aggregate according to the present invention, a functional material such as metal is encapsulated in a carbon nanohorn having an opening formed by oxidization, and with closing the opening by a heat treatment using surrounding impurity carbon or by self deformation, the encapsulated substance is aggregated and stabilized in the central part of the carbon nanohorn aggregate.

Advantages of the Invention

According to the invention of this application, even when encapsulating a substance which dissolves away or causes reaction under conditions such as the body, the encapsulated substance is isolated from outside. On the other hand, since chemically stable carbon nanohorns come into direct contact with external environment, the aggregate is stable even in an acidic atmosphere or the like. For that reason, the substance-encapsulating carbon nanohorn aggregate of the present invention has high stability against oxidation, corrosion or dissolution. Also, the encapsulated metal is not oxidized and is stable even in an oxidative atmosphere.

Further, since the encapsulated substance has a size of about 5 to 50 nm in an environment isolated from outside, the substance-encapsulating carbon nanohorn aggregate according to the present invention is most suitable for improving effects of contrast medium or for application to targeting in DDS utilizing magnetization or the like.

BEST MODE FOR CARRYING OUT THE INVENTION

The invention of this application has the characteristics as described above. An exemplary embodiment thereof will be described below.

Figure 1:
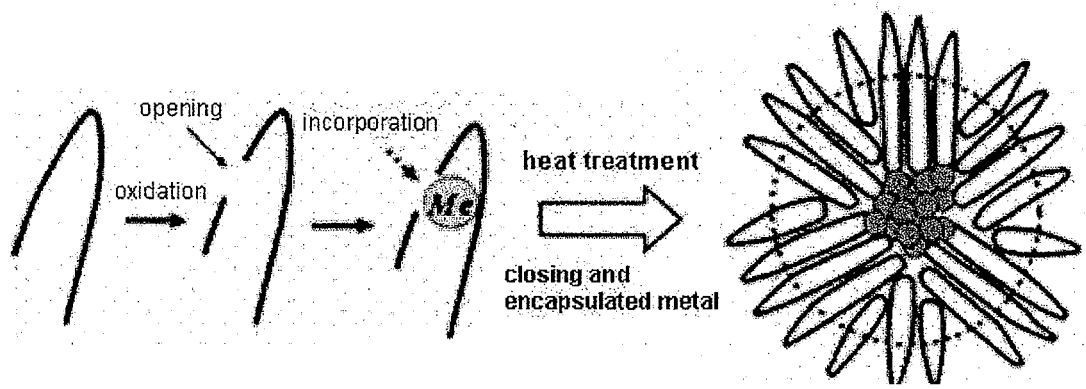
FIG. 1 is a view schematically illustrating an outline of a process for preparing the substance-encapsulating carbon nanohorn aggregate of the present invention.

FIG. 1 is a view schematically illustrating the substance-encapsulating carbon nanohorn aggregate of the present invention and an outline of the process for producing the same.

In the process for preparing the substance-encapsulating carbon nanohorn aggregate according to the present invention, first an oxidation treatment for preparing a carbon nanohorn having an opening formed by oxidization is carried out as shown in FIG. 1. In that stage, portions such as side faces, having a five-membered ring or a seven-membered ring, are preferentially opened. Next, an encapsulation substance such as metal is incorporated into the inside of carbon nanohorns through the opening. The encapsulation substance according to the present invention means a metallic substance or a precursor thereof. The encapsulation substance is introduced into the inside of nanohorns directly by sublimation or in the form of being dissolved in a solvent. Then a heat treatment is conducted in vacuum, inert gas, hydrogen or in a combination thereof. By the treatment, the encapsulated substance is transferred through a tubular sheath and aggregated in the central part of carbon nanohorns to form an aggregate having a size of 2 nm or more.

The carbon nanohorn used as a starting material is an aggregate of carbon nanohorns each of which has a diameter of 2 to 5 nm and which are aggregated in a spherical form with the tips of the horns directed outward. Aggregates having a diameter of 30 to 200 nm can be used. When forming a small opening in the carbon nanohorn, the size of the opening can be controlled by various oxidation conditions. In the oxidation by a heat treatment in an oxygen atmosphere, the size of the opening in carbon nanohorns can be controlled by changing the temperature of the oxidation treatment. An opening having a diameter of 0.3 to 1 nm can be formed at 350 to 550° C. Also, an opening can be formed by treatment with acid or the like as described in Japanese Patent Laid-Open No. 2003-95624. An opening of 1 nm can be formed with a nitric acid solution at 110° C. in 15 minutes and an opening of 1 nm can be formed with hydrogen peroxide at 100° C. in 2 hours. By changing the diameter of openings by controlling the condition of forming openings, the amount (size) of the encapsulation substance incorporated into the inside of carbon nanohorns can be controlled. As described later, the amount of the encapsulation substance incorporated into the inside of carbon nanohorns can also be controlled by changing the condition of incorporating the encapsulation substance. As described above, controlling the amount of the encapsulation substance incorporated into the inside of carbon nanohorns allows to control the size of the encapsulated substance held in the carbon nanohorns, and further the size of the substance encapsulated in the central part of the carbon nanohorns after heat treatment.

By a heat treatment in vacuum, inert gas, hydrogen or in a combination thereof, the encapsulated substance is transferred to the central part and aggregated. In this case, the heat treatment temperature is preferably in the range of room temperature to 1800° C. It is desirable that the temperature of heating is appropriately controlled to a temperature near the melting point of the encapsulated substance. Also, the encapsulated substance can be transferred at the evaporation temperature of the encapsulated substance depending on the type of the encapsulated substance. A temperature of 1800° C. or higher is not preferable because graphitization of carbon nanohorn tends to occur. The inert gas is preferably nitrogen, argon, helium or neon. Further, the encapsulated substance can also be transferred with being reduced by hydrogen or the like.

Substances to be encapsulated in carbon nanohorns having an opening formed by oxidization are not particularly limited, and intended substances include those which are sublimated in vacuum or inert gas or dissolved in a solvent to exist in a solution when introducing the encapsulation substance in the process for producing a substance-encapsulating carbon nanohorn aggregate of the present invention. Any one of an organic substance, an inorganic substance and a metal, or a mixture of two or more of them can be used as long as they are substances as described above. When a plurality of substances is encapsulated, the chemical reaction between the substances results in the intended properties, for example, catalytic properties. In that case, the composition of the encapsulation substance can be controlled by controlling the mixing ratio of substances to be encapsulated. Alternatively, when a plurality of substances is encapsulated, each substance can be designed to function as a different catalyst.

Although types of substances encapsulated in the substance-encapsulating carbon nanohorn aggregate in the invention of this application are not particularly limited, a paramagnetic metal or ferromagnetic metal can be used as metal in particular. As such a metal, a rare earth metal selected from Gd, Ce, Pr, Sm, Eu, Tb, Dy, Er, Ho, Tm and Yb, a single metal selected from Mn, Fe, Ni, Co, Ru, Rh, Pt and Pd and an alloy thereof can be used. Of them, Gd is particularly preferable in terms of contrast effects. Also, as a ferromagnetic metal, a single metal of Fe, Ni and Co and an alloy thereof can be used, and Fe is particularly desirable in terms of contrast effects or as a material for targeting from the outside of the body using a magnet. Oxides of the above metals are preferred as inorganic substances, and organic functional substances such as fullerene, metal-encapsulated fullerene, dexamethasone (DEX), doxorubicin (DRX), tetrathiafulvalen (TTF) and tetracyanoquinodimethane (TCNQ) and metal aggregates such as ferrocene, phthalocyanine and cisplatin are preferably used as organic substances. The pressure of the atmosphere for introducing those substances is preferably 1 atm or less in a gas phase, and the size and the amount can be controlled by changing the amount, the temperature or the time of introduction. The amount of introduction is preferably up to about 60% by weight. The temperature upon the introduction is preferably room temperature to about 1800° C. and the time of the introduction can be up to about 48 hours. In a liquid phase, the size and the amount of the substance to be introduced can be controlled by changing solvents, the pH or the concentration in a solution, temperature or time. In that case, concentrations up to the saturated concentration in each solvent can be employed and the temperature is preferably room temperature to about 300° C. and the time can be up to about 200 hours.

By subjecting to a heat treatment in vacuum, inert gas or a reducing atmosphere after introducing various encapsulated substances as described above, the substance initially introduced is transferred to the central part. When the temperature is 800 to 1800° C. at that time, nano openings formed by the opening treatment can be closed. At this stage, some of the encapsulated substance is transferred to the tip of nanohorns as well because of the high stability resulting from the large contact area with the sheath of the nanohorns.

Also, the substance-encapsulating carbon nanohorn aggregate described above is characterized in that the encapsulation substance incorporated therein can be any one of a metal, an inorganic substance and an organic substance, a mixture of two or more of them, or a compound thereof. A metal such as Gd, Fe or lanthanoid or an oxide thereof is particularly effective for a contrast medium.

For the substance-encapsulating carbon nanohorn aggregate described above, a petal-like graphene sheet-containing carbon nanohorn aggregate (petal-containing carbon nanohorn aggregate), a dahlia-shaped carbon nanohorn aggregate, a bud-shaped carbon nanohorn aggregate or a seed-shaped carbon nanohorn aggregate can be used. Herein, the petal means a structure of 1 to 10 layers of stacked graphenes, having length and width dimensions of about 30 nm to 200 nm.

In the substance-encapsulating carbon nanohorn aggregate described above, the encapsulated substance is aggregated in the central part by a heat treatment and then substitution with a hydrophilic group can be done by another oxidation treatment. In the carbon nanohorn aggregate having an opening therein, a hydrophilic group can be attached to the edge of the opening. Examples of hydrophilic groups for the substitution include a carbonyl group, a carboxyl group and a hydroxyl group, but are not limited thereto. Also, addition of an organic substance or a biologically-relevant molecule to the hydrophilic group attached to the edge of the opening can offer properties such as solvent dispersibility and biological affinity.

The substance-encapsulating carbon nanohorn aggregate described above is characterized in that the incorporated encapsulated substance is preferably transferred through a tubular sheath when transferred by a heat treatment or the like.

The process for producing a substance-encapsulating carbon nanohorn aggregate according to the present invention includes aggregating the substance to be encapsulated in the central part or the neighborhood thereof by a heat treatment. A closing treatment of a carbon nanohorn aggregate having an opening therein can be simultaneously performed by the heat treatment as described above.

Exemplary Embodiments

Next, exemplary embodiments of the present invention will be described but the present invention is not limited to these exemplary embodiments.

(Preparation of Substance-Encapsulating Carbon Nanohorn Aggregate)

Figure 2:
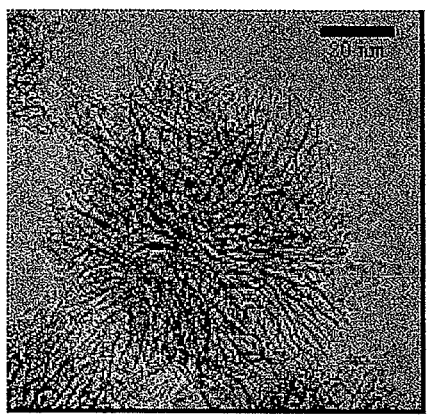
FIG. 2 is an electron micrograph of CNH used in the present invention.
Figure 3:
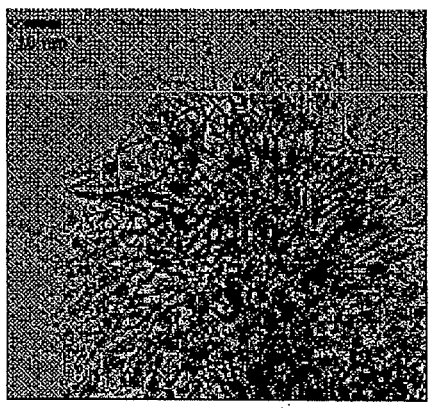
FIG. 3 is an electron micrograph of Gd@oxCNH prepared according to the present invention.
Figure 4:
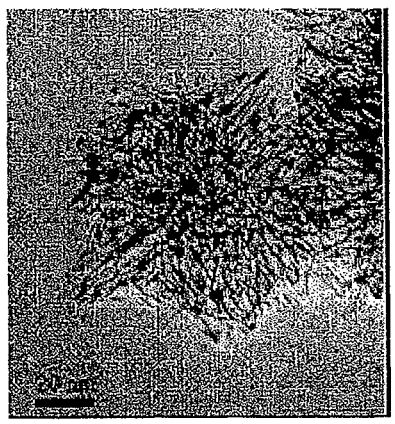
FIG. 4 is an electron micrograph of HTGd@oxCNH prepared according to the present invention.
Figure 5:
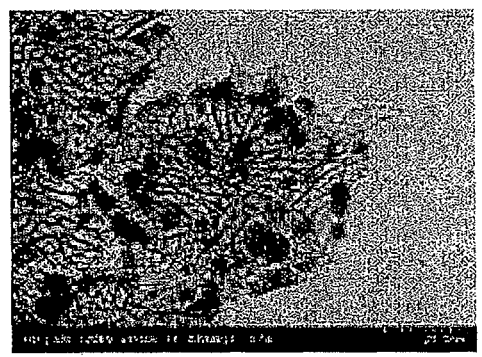
FIG. 5 is an STEM image of HTGdCNH prepared according to the present invention before treating with hydrochloric acid.

For the opening treatment of carbon nanohorns (CNH) (FIG. 2), a heat treatment was performed in oxygen at 500° C. for 10 minutes (oxCNH). The treatment was performed at an oxygen flow rate of 200 ml/min. Next, gadolinium acetate (50 mg) and the oxCNH (50 mg) were mixed in 20 ml of an ethanol solution and the mixture was stirred at room temperature for about 24 hours. Subsequently, the resultant was filtered three times using a filter and vacuum-dried for 24 hours to evaporate and completely remove the solvent or the like therein (Gd@oxCNH). The electron micrograph is shown in FIG. 3. Black spots represent gadolinium acetate, proving that gadolinium acetate has been incorporated into the oxCNH. The particle size is generally determined to be 2 to 5 nm based on the size of the sheath. Next, the Gd@oxCNH was subjected to a heat treatment at 1200° C. in an inert gas atmosphere such as argon for 3 hours (HTGd@oxCNH). The electron micrograph is shown in FIG. 4, showing that a Gd compound has been encapsulated therein. At this stage, a large Gd compound is observed in the central part of the HTGd@oxCNH. This seems to show that the Gd compound has been transferred to the central part. It is also considered that some has been transferred to the tip. For comparison, gadolinium acetate was also supported on untreated CNH (GdCNH) in the same way as described above. They were also subjected to a heat treatment at 1200° C. in an inert gas atmosphere for 3 hours (HTGdCNH) (FIG. 5). FIG. 5 shows that a Gd compound of about 3 to 10 nm is supported in a dispersed state in HTGdCNH. This seems to be because adsorption sites are located only on the outside of the sheath of the CNH and so surface diffusion and aggregation of Gd have been caused by the heat treatment. The openings in the HTGd@oxCNH were closed by the above-described heat treatment at 1200° C.

(Evaluation of Substance-Encapsulating Carbon Nanohorn Aggregate)

Figure 6:
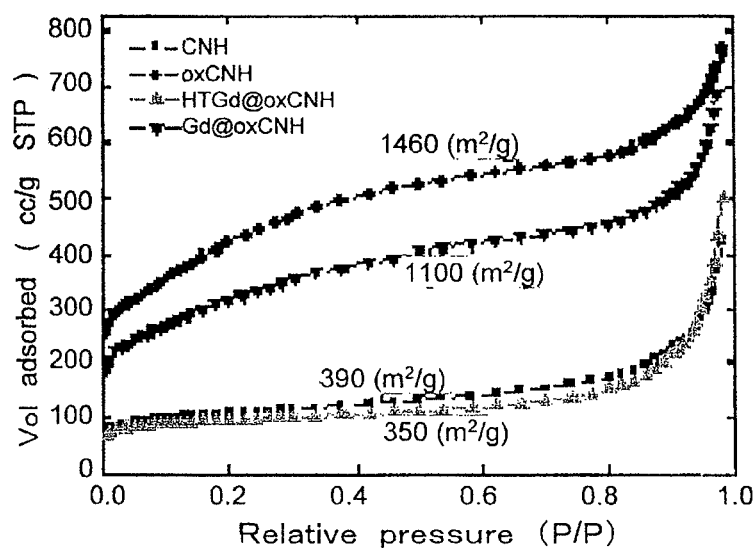
FIG. 6 illustrates adsorption isotherms with nitrogen at 77 K and specific surface areas estimated by a BET method of CNH, oxCNH, Gd@oxCNH and HTGd@oxCNH prepared in the present invention.

Nitrogen adsorption of CNH, oxCNH, Gd@oxCNH and HTGd@oxCNH was measured at 77 K by ASAP2000. FIG. 6 illustrates adsorption isotherms obtained in the measurement and results of the calculation of specific surface areas using a BET method. FIG. 6 shows that the oxCNH has had a significantly increased adsorption compared to the CNH and has had a specific surface area of 1460 $m^2/g$, which is about 4 times that of the CNH. This means that an opening has formed on the surface of the CNH and the small opening in the inside has become available for adsorbing nitrogen. Also, the Gd@oxCNH was found to have a specific surface area of 1100 $m^2/g$. This has proved that even after the encapsulation of a Gd compound, nitrogen can pass through the opening on the oxCNH surface and the opening can be filled with nitrogen. However, the HTGd@oxCNH has had almost the same nitrogen adsorption as the CNH although a Gd compound was encapsulated, revealing that the opening has been closed.

Figure 7:
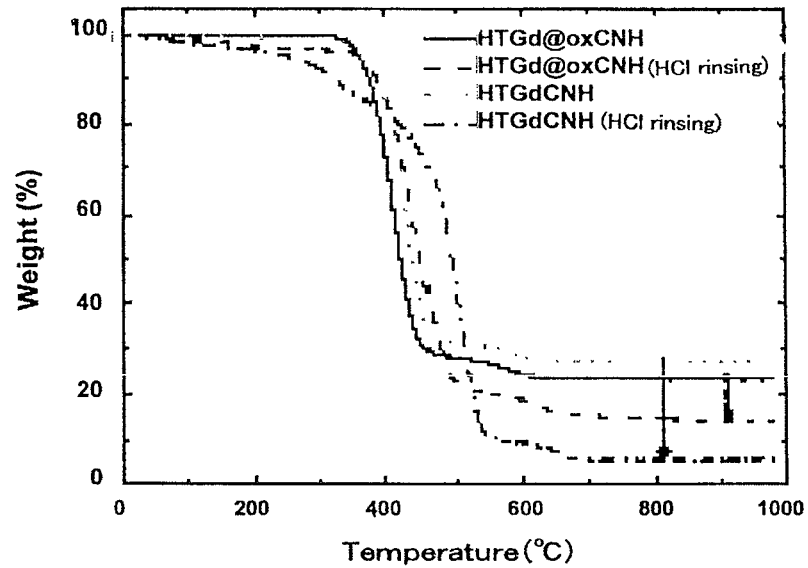
FIG. 7 is a view illustrating the result of thermogravimetric analysis before and after treating with hydrochloric acid of HTGd@oxCNH and HTGdCNH prepared according to the present invention.
Figure 8:
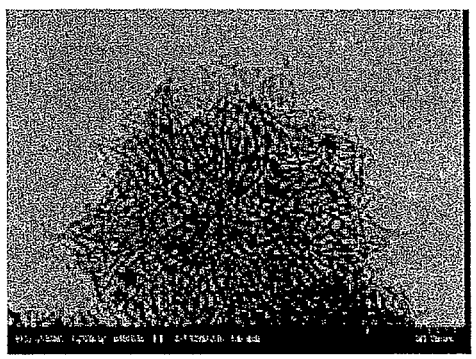
FIG. 8 is an STEM image of HTGdCNH prepared according to the present invention after treating with hydrochloric acid.
Figure 9:
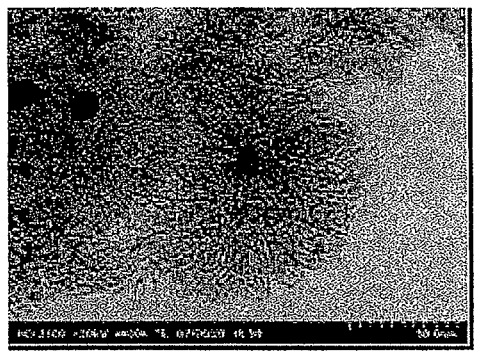
FIG. 9 is an STEM image of HTGd@oxCNH prepared according to the present invention after treating with hydrochloric acid.
Figure 10:
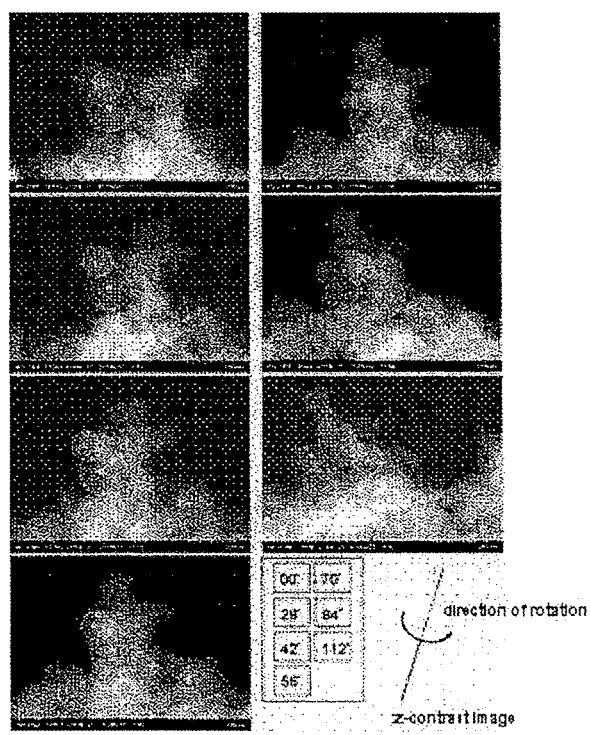
FIG. 10 show Z-contrast images obtained by observing HTGd@oxCNH prepared according to the present invention after treating with hydrochloric acid with continuously rotating 112°.

The HTGd@oxCNH in which openings are closed and the HTGdCNH were stirred in a 5 M hydrochloric acid solution for 24 hours. Thereafter the resultant was sufficiently washed with water using a filter. These procedures were performed 3 times. Whether Gd has been eluted from the collected samples or not was examined. FIG. 7 shows the result of thermogravimetric analysis (TGA) of HTGd@oxCNH and HTGdCNH before and after rinsing with hydrochloric acid. For the measurement conditions, the measurement was performed in oxygen with increasing the temperature at 10° C./min. Although the weight of Gd in HTGdCNH has decreased by 25% by rinsing with hydrochloric acid, the weight of Gd in HTGd@oxCNH has decreased by only 7%, showing a significant increase in acid resistance. An STEM image of HTGdCNH after treating with hydrochloric acid is each shown in FIG. 8. Before treating with hydrochloric acid (FIG. 5), a Gd compound of about 3 to 10 nm is supported in a dispersed state (FIG. 5). However, after treating with hydrochloric acid, almost all of the Gd compound has been eluted, showing a consistency with the result of TGA (FIG. 8). The STEM result of HTGd@oxCNH after treating with hydrochloric acid in FIG. 9 has proved that although Gd on the outside seems to be slightly decreased compared to the state before treating with hydrochloric acid in FIG. 4, Gd observed near the center has almost remained. This seems to show that portions near the center are more stable. Also, the Gd compound aggregated near the center of the HTGd@oxCNH had a size of 10 to 20 nm. FIG. 10 shows Z-contrast images of the Gd compound observed near the center rotated 112°. It is found that despite the change in the angle, the Gd in the central part of the HTGd@oxCNH is observed at the same position. The result proves the presence of the Gd compound in the center of carbon nanohorns. Accordingly, judging from the gas adsorption measurement, TGA and Z-contrast images, the Gd compound is aggregated near the center with being isolated from outside as shown in FIG. 1.

(Solvent Dispersibility and Biological Affinity)

HTGd@oxCNH (40 mg) was dispersed in 100 ml of a hydrogen peroxide solution to perform an oxidation treatment at room temperature for 6 hours. Subsequently, hydrogen peroxide was rinsed off using a filter and the resultant was dried in vacuum. The resulting sample was then subjected to thermogravimetric analysis in He. The analysis was performed in a temperature range of room temperature to 600° C. at a temperature increase rate of 5° C./min. As a result, a weight reduction was observed at about 400° C., showing that about 1% of a surface functional group such as a carboxyl group was adsorbed. Polyethylene glycol (PEG) or the like was added thereto and the resultant was dispersed in phosphate buffered saline (PBS) to observe improvement in solvent affinity and biological affinity; as a result, while the carbon nanohorn aggregate without the above treatment was coagulated and sedimented, the hydrophilicity of the substance-encapsulating carbon nanohorn aggregate which has undergone the treatment has improved and no sedimentation was observed at all after 24 hours.

This application claims priority based on Japanese Patent Application No. 2007-247269 filed Sep. 25, 2007, which is hereby incorporated by reference in full.

The invention claimed is:

1. A substance-encapsulating carbon nanohorn aggregate comprising
    a carbon nanohorn aggregate that is an aggregate of carbon nanohorns which are aggregated in a spherical form with the tips of the horns directed outward;
    an encapsulated substance that is aggregated in the central part of the carbon nanohorn aggregate, and
    openings in the carbon nanohorn aggregate that have a hydrophilic group at the edge of the openings,
wherein
    after aggregating the encapsulated substance in the central part of the carbon nanohorn aggregate by heat treatment at a temperature selected from 800° C. to 1800° C. in an inert gas atmosphere, which is selected from the group consisting of nitrogen, argon, helium and neon, and closing the openings in the carbon nanohorns used for incorporating the substance inside the carbon nanohorns by the heat treatment,
    the openings having the hydrophilic group at the edge of the openings are formed by an oxidation treatment at room temperature in a hydrogen peroxide solution, so that the openings having the hydrophilic group at the edge of the openings are other than the openings used for incorporating the substance, and wherein the encapsulated substance aggregate in the central part of the carbon nanohorn aggregate has a size of 5-50 nm, and wherein the carbon nanohorn aggregate has a spherical shape with a diameter of 30-200 nm.

2. The substance-encapsulating carbon nanohorn aggregate according to claim 1, wherein
    the hydrophilic group is selected from the group consisting of a carbonyl group, a carboxyl group and a hydroxyl group.

3. The substance encapsulating carbon nanohorn aggregate according to claim 1, wherein the carbon nanohorn aggregate has an organic substance or a biologically-relevant molecule added to the hydrophilic group attached to the edge of the opening to offer at least one of solvent dispersibility or biological affinity.

* * * * *